(12) United States Patent
Kim

(10) Patent No.: US 8,802,281 B2
(45) Date of Patent: *Aug. 12, 2014

(54) SECONDARY BATTERY WITH MOVEMENT PREVENTION TAPE

(75) Inventor: Daekyu Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 696 days.

This patent is subject to a terminal disclaimer.

(21) Appl. No.: 13/033,970

(22) Filed: Feb. 24, 2011

(65) Prior Publication Data

US 2012/0034513 A1   Feb. 9, 2012

Related U.S. Application Data

(60) Provisional application No. 61/371,118, filed on Aug. 5, 2010.

(51) Int. Cl.
| | | |
|---|---|---|
| *H01M 2/08* | (2006.01) | |
| *H01M 2/02* | (2006.01) | |
| *H01M 2/10* | (2006.01) | |
| *H01M 6/04* | (2006.01) | |

(52) U.S. Cl.
USPC ........... 429/182; 429/174; 429/178; 429/179; 429/186; 429/188

(58) Field of Classification Search
USPC ......... 429/162, 169, 174, 178, 182, 179, 186, 429/188
See application file for complete search history.

(56) References Cited

U.S. PATENT DOCUMENTS

| | | | |
|---|---|---|---|
| 4,957,833 A | 9/1990 | Daifuku et al. | |
| 6,743,546 B1 | 6/2004 | Kaneda et al. | |
| 7,008,720 B2 * | 3/2006 | Shimamura et al. | 429/179 |
| 8,048,559 B2 | 11/2011 | Kim | |
| 8,062,787 B2 | 11/2011 | Kim | |
| 2003/0068562 A1 | 4/2003 | Kim et al. | |

(Continued)

FOREIGN PATENT DOCUMENTS

| | | |
|---|---|---|
| CN | 1992393 A | 7/2006 |
| CN | 101431164 A | 5/2009 |

(Continued)

OTHER PUBLICATIONS

Office Action dated Mar. 24, 2011 for related U.S. Appl. No. 12/626,157, filed Nov. 25, 2009.

(Continued)

*Primary Examiner* — Patrick Ryan
*Assistant Examiner* — Julian Anthony
(74) *Attorney, Agent, or Firm* — Knobbe, Martens, Olson & Bear, LLP

(57) ABSTRACT

A secondary battery is disclosed. In one embodiment, the battery includes i) an electrode assembly and ii) first and second electrode tabs spaced apart from each other and extending from the electrode assembly, wherein the first and second electrode tabs have first and second outer surfaces, respectively. The battery may further include i) an electrolyte, ii) a movement prevention tape attached to at least a portion of at least one of the first and second outer surfaces, wherein at least part of the movement prevention tape is configured to become adhesive upon contacting the electrolyte and iii) a can accommodating the electrode assembly, electrode tabs and movement prevention tape.

21 Claims, 8 Drawing Sheets

(56) References Cited

U.S. PATENT DOCUMENTS

| | | |
|---|---|---|
| 2003/0148174 A1 | 8/2003 | Gu |
| 2004/0265702 A1 | 12/2004 | Kim |
| 2006/0154138 A1 | 7/2006 | Miyamoto et al. |
| 2006/0172190 A1 | 8/2006 | Kaplin et al. |
| 2006/0251962 A1* | 11/2006 | Kim .............................. 429/130 |
| 2007/0119047 A1 | 5/2007 | Gu |
| 2007/0154787 A1 | 7/2007 | Jang et al. |
| 2008/0102354 A1 | 5/2008 | Lee |
| 2008/0152997 A1 | 6/2008 | Lee |
| 2008/0233474 A1 | 9/2008 | Son et al. |
| 2008/0292962 A1 | 11/2008 | Jung |
| 2009/0117459 A1 | 5/2009 | Hyung et al. |
| 2009/0297929 A1 | 12/2009 | Uchida |
| 2010/0080018 A1 | 4/2010 | Overes |
| 2012/0077071 A1 | 3/2012 | Jung |

FOREIGN PATENT DOCUMENTS

| | | |
|---|---|---|
| DE | 43 27 293 A1 | 3/1994 |
| EP | 1 717 879 A1 | 11/2006 |
| EP | 1 804 320 A2 | 7/2007 |
| EP | 2 019 442 A1 | 1/2009 |
| GB | 1 385 910 | 3/1975 |
| JP | 04-329259 A | 11/1992 |
| JP | 06-150971 A | 5/1994 |
| JP | 10-302751 A | 11/1998 |
| JP | 2000-133220 | 5/2000 |
| JP | 2001-273933 A | 10/2001 |
| JP | 2003-151634 A | 5/2003 |
| JP | 2004-228078 A | 8/2004 |
| JP | 2007-012631 A | 1/2007 |
| JP | 2008-019311 A | 1/2008 |
| JP | 2010-511987 A | 4/2010 |
| KR | 10-2003-0066959 A | 8/2003 |
| KR | 10-2007-0025722 A | 3/2007 |
| KR | 10-0719725 B1 | 5/2007 |
| KR | 10-2007-0096649 A | 10/2007 |
| KR | 10-2008-0057977 A | 6/2008 |
| KR | 10-2008-0102606 A | 11/2008 |
| KR | 10-2009-0007074 A | 1/2009 |

OTHER PUBLICATIONS

Korean Notice of Allowance dated Apr. 4, 2013 for Korean Patent Application No. KR 10-2011-0021925 which claims priority from U.S. Appl. No. 61/371,118, filed Aug. 5, 2010; and captioned U.S. Appl. 13/033,970.

Office Action dated Apr. 18, 2012 for U.S. Appl. No. 12/831,975, filed Jul. 7, 2010, which is related to captioned U.S. Appl. No. 13/033,970.

Notice of Allowance dated Jun. 7, 2012 for U.S. Appl. No. 12/554,528, filed Sep. 4, 2009, which is related to captioned U.S. Appl. No. 13/033,970.

Notice of Allowance dated Jul. 5, 2011 for U.S. Appl. No. 12/554,504, filed Sep. 4, 2009, which is related to captioned U.S. Appl. No. 13/033,970.

Korean Office Action dated Oct. 11, 2011 for Korean Patent Application No. KR 10-2009 0119812 corresponding to U.S. Appl. No. 12/554,528, filed Sep. 4, 2009, which is related to captioned U.S. Appl. No. 13/033,970.

Office Action dated Oct. 25, 2012 for U.S. Appl. No. 12/831,975, filed Jul. 7, 2010, which is related to captioned U.S. Appl. No. 13/033,970.

Extended European Search Report dated Aug. 18, 2010 for EP Application No. EP 09 25 2269.7 corresponding to U.S. Appl. No. 12/554,528, filed Sep. 4, 2009 which is related to the captioned application.

Office Action dated Feb. 15, 2011 for related U.S. Appl. No. 12/554,504, filed Sep. 4, 2009.

European Search Report dated Dec. 13, 2011 for European Patent Application No. EP 11 250 367.7 which corresponds to captioned U.S. Appl. No. 13/033,970.

Ophardt, Charles E., "Rubber Polymers", *Virtual Chembook*, Elmhurst College, 2003, pp. 1-2.

European Search Report dated Sep. 10, 2010 for European Patent Application No. EP 10 25 1224.1 which corresponds to U.S. Appl. No. 12/831,975, filed Jul. 7, 2010, which is related to captioned U.S. Appl. No. 13/033,970.

Office Action dated Feb. 7, 2012 for U.S. Appl. No. 12/554,528, filed Sep. 4, 2009, which is related to captioned U.S. Appl. No. 13/033,970.

Korean Office Action dated Aug. 25, 2011 for Korean Patent Application No. KR 10-2010-0047292 which corresponds to U.S. Appl. No. 12/831,975, filed Jul. 7, 2010, which is related to captioned U.S. Appl. No. 13/033,970.

Chinese Office Action dated Jul. 18, 2013 for Chinese Patent Application No. CN 201010221253.3, which shares priority of Korean Patent Application No. KR 10-2010-0047292 with U.S. Appl. No. 12/831,975, filed Jul. 7, 2010, which is related to captioned U.S. Appl. No. 13/033,970.

Chinese Office Action dated Sep. 18, 2013 for Chinese Patent Application No. CN 201110217262.X which claims priority from U.S. Appl. No. 61/371,118, filed May 8, 2010, and captioned U.S. Appl. No. 13/033,970.

* cited by examiner

SECONDARY BATTERY WITH MOVEMENT PREVENTION TAPE

RELATED APPLICATIONS

This application claims priority to and the benefit of Provisional Patent Application No. 61/371,118 filed on Aug. 5, 2010 in the U.S. Patent and Trademark Office, the entire contents of which are incorporated herein by reference.

This application also relates to U.S. patent application Ser. Nos. 12/554,528 and 12/554,504 both filed on Sep. 4, 2009, and Ser. No. 12/626,157 filed on Nov. 25, 2009, all of which are incorporated herein by reference in their entirety.

BACKGROUND

1. Field

The described technology generally relate to a secondary battery and a method of manufacturing the same.

2. Description of the Related Technology

A secondary battery is generally formed by accommodating an electrode assembly including a positive electrode plate, a negative electrode plate and a separator interposed between the positive and negative electrode plates, in a battery case with an electrolyte. The secondary battery may be classified into cylindrical, prismatic and pouch type batteries according to the shape of the case.

The positive electrode plate has a positive electrode coating portion and the negative electrode plate has a negative electrode coating portion. The electrode assembly may further include a positive electrode tab and a negative electrode tab. The positive and negative electrode tabs are welded or attached to the positive and negative electrode plates, respectively. The positive and negative electrode tabs protrude upwardly and/or downwardly a predetermined length from the electrode assembly, and end portions of each of the electrode tabs are welded or attached to other components of the secondary battery.

SUMMARY

One inventive aspect is a secondary battery which can prevent an electrode tab from moving inside a battery case due to an external impact, such as an external vibration or a drop.

Another aspect is a secondary battery including an electrode assembly having a first electrode tab and a second electrode tab drawn out therefrom; and a case accommodating the electrode assembly, wherein a movement prevention tape, which exhibits adhesiveness when it contacts an electrolyte, is attached to at least one portion of at least one of the first electrode tab and the second electrode tab.

Another aspect is a secondary battery, comprising: an electrode assembly; first and second electrode tabs spaced apart from each other and extending from the electrode assembly, wherein the first and second electrode tabs have first and second outer surfaces, respectively; an electrolyte; a movement prevention tape attached to at least a portion of at least one of the first and second outer surfaces, wherein at least part of the movement prevention tape is configured to become adhesive upon contacting the electrolyte; and a can accommodating the electrode assembly, electrode tabs and movement prevention tape.

In the above battery, the movement prevention tape comprises i) an adhesive layer at least partially surrounding at least one of the first and second outer surfaces and ii) a base layer formed on the adhesive layer, and wherein at least part of the base layer is configured to become adhesive upon contacting the electrolyte.

In the above battery, an adhesive portion of the base layer has a tensile strength of at least about 0.1 $kgf/cm^2$. In the above battery, the base layer is formed of a polymer film. In the above battery, the electrolyte contains a carbonate-based solvent, and wherein the carbonate-based solvent is configured to melt at least a portion of the polymer film. In the above battery, the polymer film is configured to at least partially shrink and at least partially expand. In the above battery, the polymer film is formed of at least one of the following: polystyrene (PS), polyamide, polyacrylonitrile, polycarbonate, polyethylene acetate and oriented polystyrene.

In the above battery, the base layer has a thickness of about 10 µm to about 50 µm. In the above battery, the adhesive layer is formed of at least one of the following: PMMA (poly methyl methacrylate), PEMA (poly ethyl methacrylate) and PBMA (poly butyl methacrylate). In the above battery, the adhesive layer has a thickness of about 1 µm to about 30 µm. In the above battery, the first and second electrode tabs have first and second lengths, respectively, and wherein the base layer is formed between i) a portion of about ⅔ of the length of at least one of the first and second electrode tabs and ii) the electrode assembly. In the above battery, the movement prevention tape substantially completely surrounds at least one of the first and second electrode tabs.

The above battery further comprises: a cap assembly configured to substantially close the can; a sub-plate accommodated in the can and attached to the cap assembly; and an insulator formed on a surface of the electrode assembly, wherein an adhesive portion of the movement prevention tape contacts at least one of the sub-plate and insulator. The above battery further comprises an insulation tape formed between i) at least one of the first and second outer surfaces and ii) the movement prevention tape.

In the above battery, the first and second electrode tabs are attached to opposite sides of the electrode assembly. In the above battery, the first and second electrode tabs are attached to the same side of the electrode assembly. In the above battery, the movement prevention tape is attached to the first and second outer surfaces.

Another aspect is a secondary battery, comprising: an electrode assembly; first and second electrode tabs spaced apart from each other and extending from the electrode assembly, wherein the first and second electrode tabs have first and second outer surfaces, respectively; a movement prevention tape attached to at least a portion of at least one of the first and second outer surfaces; a can accommodating the electrode assembly, electrode tabs and movement prevention tape; and a cap assembly configured to substantially close the can, wherein at least part of the movement prevention tape contacts at least the cap assembly.

In the above battery, the at least part of the movement prevention tape contacts the electrode assembly. In the above battery, the movement prevention tape comprises i) an adhesive layer at least partially surrounding at least one of the first and second outer surfaces and ii) a base layer formed on the adhesive layer. In the above battery, the base layer has a tensile strength of at least about 0.1 $kgf/cm^2$.

The above battery further comprises: a sub-plate accommodated in the can and attached to the cap assembly; and an insulator formed on a surface of the electrode assembly, wherein at least part of the base layer contacts at least one of the sub-plate and insulator. In the above battery, the base layer is formed of at least one of the following: polystyrene (PS), polyamide, polyacrylonitrile, polycarbonate, polyethylene acetate and oriented polystyrene.

DETAILED DESCRIPTION

Figure 1:
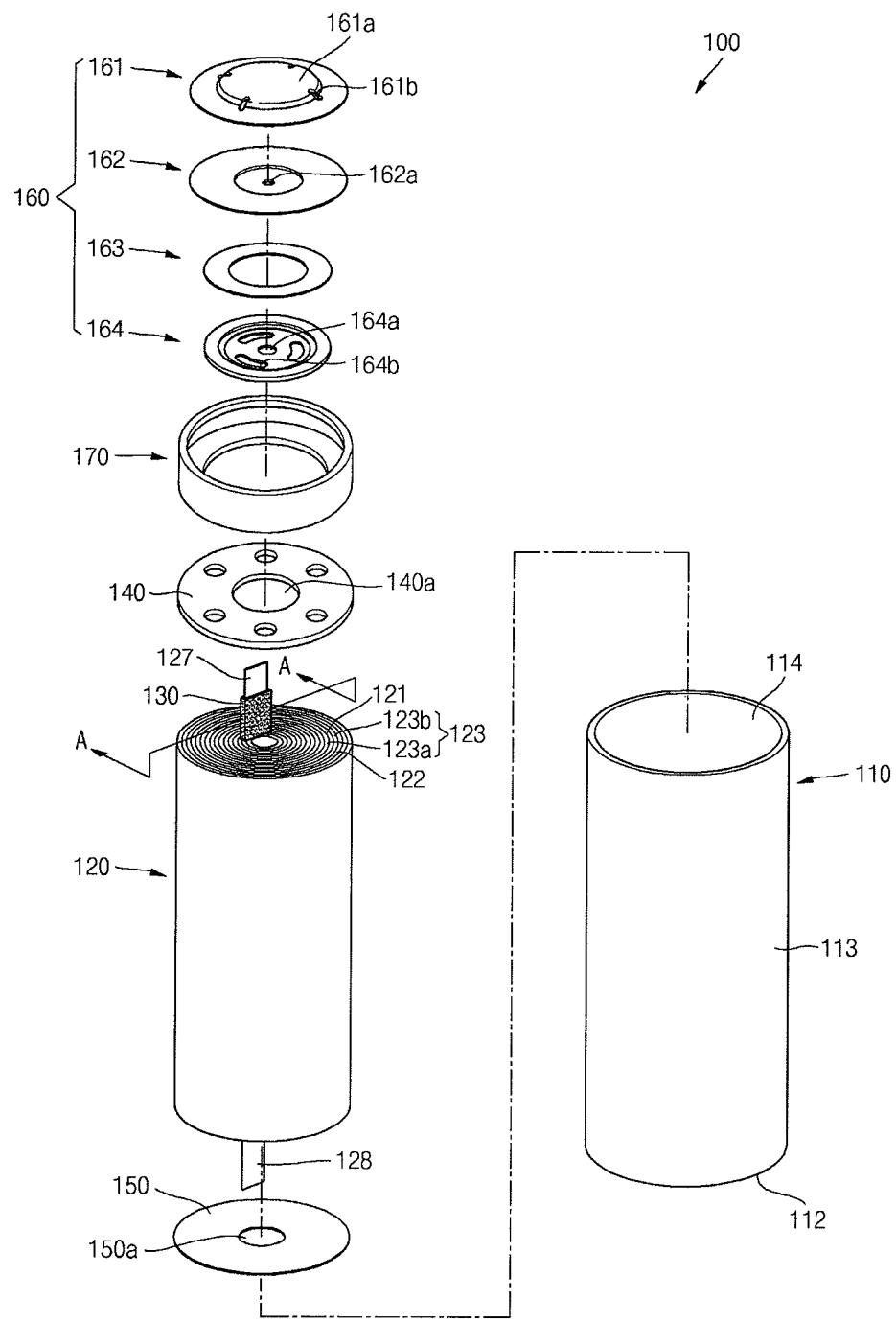
FIG. 1 is an exploded perspective view of a cylindrical secondary battery according to an embodiment.

Generally, when an external impact, such as an external vibration or a drop, is applied to a secondary battery, an electrode tab such as the positive or negative electrode tab disposed inside the battery case may move. The movement of the electrode tab may cause the electrode tab to be separated from the non-coating portion or other components of the electrode assembly. In such a case, internal resistance of the secondary battery may increase, resulting in heating of the secondary battery.

Embodiments will now be described in detail with reference to the accompanying drawings.

As shown in FIGS. 1 through 4, a cylindrical secondary battery 100 includes a case 110, an electrode assembly 120, an upper insulation member 140, a lower insulation member 150, a cap assembly 160, and a gasket 170.

The case 110 may be a cylindrical, prismatic or pouch type according to the shape of the secondary battery 100. For the purpose of convenience, the embodiment of FIGS. 1-4 will be described with regard to a cylindrical type secondary battery. A prismatic secondary battery and a pouch type secondary battery will later be described with reference to other embodiments.

The case 110 is shaped of a cylinder and may be made of a light-weight, conductive material such as aluminum, or an aluminum alloy. The case 110 may be formed by, for example, a deep drawing process. The case 110 may have various shapes according to the shape of the electrode assembly 120.

Figure 3A:
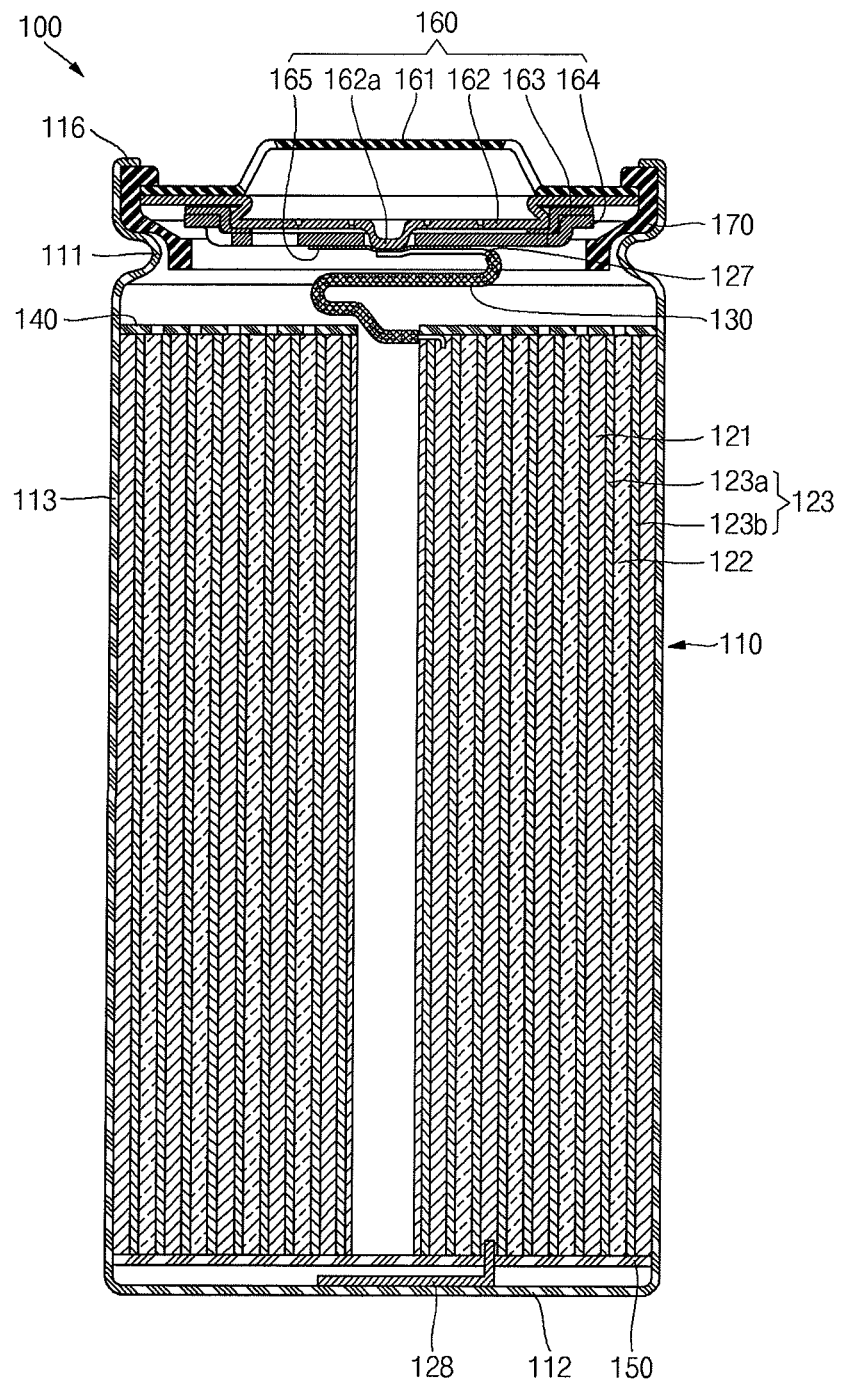
FIG. 3A is a cross-sectional view illustrating a state in which an electrolyte is not injected into the cylindrical secondary battery shown in FIG. 1.

The case 110 includes a circular bottom plate 112, and a cylindrical sidewall 113 upwardly extending from the edge of the bottom plate 112. Referring to FIG. 3A, a beading part 111 inwardly bent along the outer circumference of the sidewall 113 is formed at an upper portion of the sidewall 113. The beading part 111 prevents the upper insulation member 140, the electrode assembly 120 and the lower insulation member 150 from moving inside the case 110 in a direction substantially perpendicular to the bottom plate 112. A crimping part 116 is formed at a top end of the sidewall 113. The crimping part 116 substantially seals a gap between the case 110 and the cap assembly 160.

Referring to FIG. 1, an opening 114 is formed at the upper portion of the sidewall 113 so as to allow the lower insulation member 150, the electrode assembly 120, the upper insulation member 140, the gasket 170 and the cap assembly 160 to be inserted into the case 110 in turn.

The electrode assembly 120 may include a first electrode plate 121, a second electrode plate 122 and a separator 123. The separator 123 may include a first separator 123a and a second separator 123b. The electrode assembly 120 may be formed by sequentially stacking the first electrode plate 121, the first separator 123a, the second electrode plate 122 and the second separator 123b and winding the stacked structure in a cylindrical configuration. A first electrode tab 127 is drawn out from an upper portion of the electrode assembly 120 and an end of the first electrode tab 127 is connected to a sub-plate 165 of the cap assembly 160. A second electrode tab 128 is drawn out from a lower portion of the electrode assembly 120 and an end of the second electrode tab 128 is connected to the bottom plate 112 of the case 110.

Either one of the first electrode plate 121 and the second electrode plate 122, for example, the first electrode plate 121, may be used as a positive electrode plate, and the other, for example, the second electrode plate 122, may be used as a negative electrode plate. Alternatively, the second electrode plate 122 may be used as a positive electrode plate, and the first electrode plate 121 may be used as a negative electrode plate. In the disclosed embodiments, for the purpose of convenience, it is assumed that the first electrode plate 121 is a positive electrode plate, and the second electrode plate 122 is a negative electrode plate.

Although not shown in detail, the positive electrode, that is, the first electrode plate 121, includes a positive electrode collector and a positive electrode coating portion coated on at least one surface of the positive electrode collector.

The positive electrode collector may be formed of a plate made of a highly conductive metal, for example, aluminum (Al) foil, which is not considered limiting.

In one embodiment, the positive electrode coating portion is formed by coating a mixture of a positive electrode active material, a conductive agent and a binder on at least one surface of the positive electrode collector. In one embodiment, the positive active material generally includes composite metal oxides such as $LiCoO_2$, $LiMn_2O_4$, $LiNiO_2$, $LiNi_{1-x}Co_xO_2$ ($0<x<1$), $LiMnO_2$, or the like, which are not considered limiting.

A first non-coating portion that is not coated with the positive electrode coating material is formed on at least one of a portion or both ends of a winding direction of the first electrode plate 121. The first electrode tab 127 as a positive electrode tab is coupled to the first non-coating portion by, for example, welding, to then be drawn out from the electrode assembly 120. Further, an end of the drawn-out first electrode tab 127 is coupled to the sub-plate 165 of the cap assembly 160 by, for example, welding, to then be electrically connected thereto.

Although not shown in detail, the negative electrode, that is, the second electrode plate 122, includes a negative electrode collector and a negative electrode coating portion coated on at least one surface of the negative electrode collector.

The negative electrode collector may be formed of a plate made of a highly conductive metal, for example, copper (Cu) or nickel (Ni) foil, which are not considered limiting.

The negative electrode coating portion may be formed by coating a mixture of a negative electrode active material, a conductive agent and a binder on at least one surface of the negative electrode collector. In one embodiment, the negative active material generally includes, carbon (C) based materials, Si, Sn, tin oxides, composite tin alloys, transition metal oxides, lithium metal nitrides, or lithium metal oxides, which are not considered limiting.

A second non-coating portion that is not coated with the negative electrode coating material is formed on at least one of a portion or both ends of a winding direction of the second electrode plate 122. The second electrode tab 128 as a negative electrode tab is coupled to the second non-coating portion by, for example, welding, to then be drawn out from the electrode assembly 120. Further, an end of the drawn-out second electrode tab 128 is coupled to the bottom plate 112 of the case 110 by, for example, welding. Accordingly, the case 110 may have a negative polarity. Additionally, the case 110, specifically the bottom plate 112 of the case 110, may be used as a negative electrode terminal of the cylindrical secondary battery 100.

The separator 123 separates the first electrode plate 121 and the second electrode plate 122 from each other. The separator 123 may include a first separator 123a and a second separator 123b. Micropores may be formed in each of the first and second separators 123a and 123b, and lithium ions pass through the micropores. The first and second separators 123a and 123b may be made of a polymer resin such as polyethylene (PE) or polypropylene (PP), which are not considered limiting.

Figure 3B:
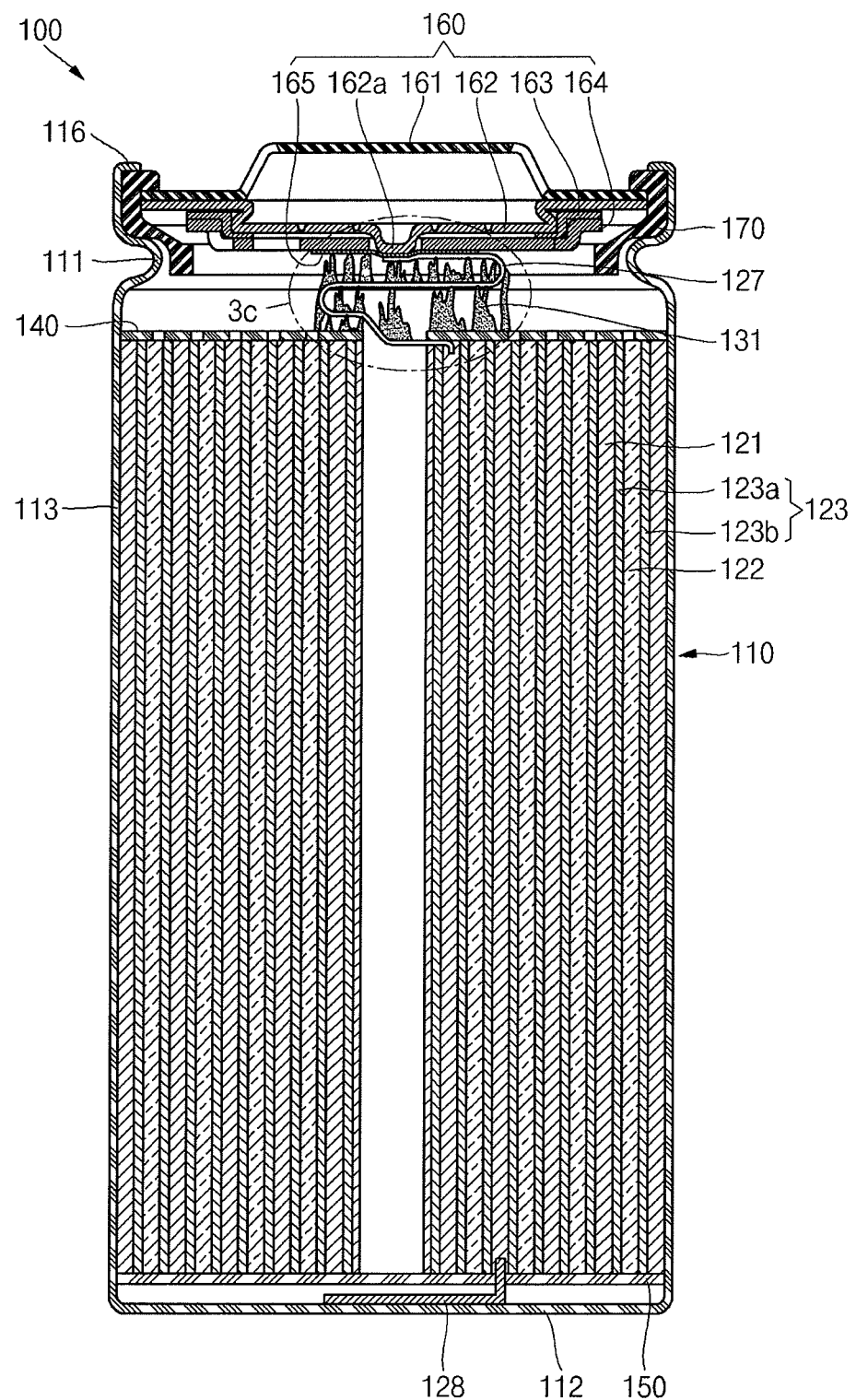
FIG. 3B is a cross-sectional view illustrating a shape of the cylindrical secondary battery resulting after injecting an electrolyte.
Figure 3C:
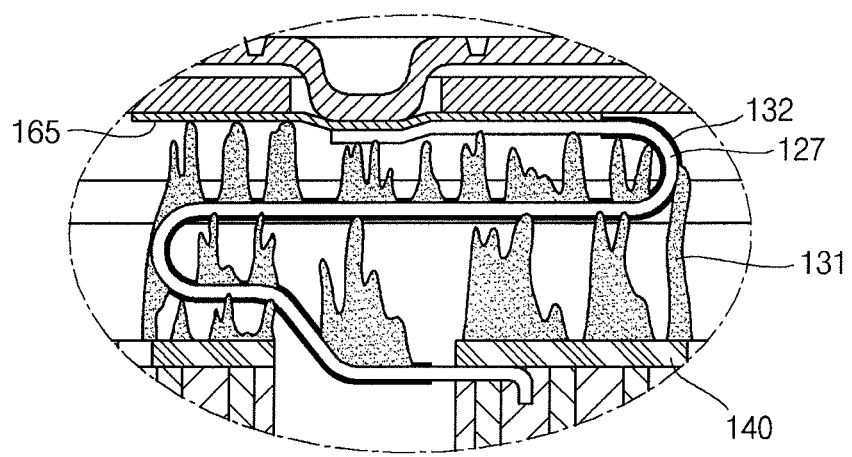
FIG. 3C is an enlarged view of a region "3C" illustrated in FIG. 3B.
Figure 4:
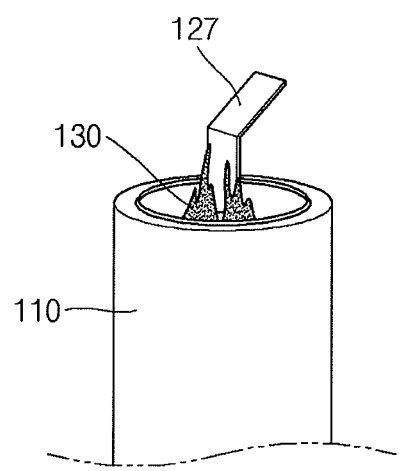
FIG. 4 illustrates a state in which a cap assembly is separated from the cylindrical secondary battery shown in FIG. 3 by cutting an upper end of the cylindrical secondary battery.

A movement prevention tape (or a tape) 130 exhibiting adhesiveness when contacting an electrolyte is attached to at least one portion of at least one of the first electrode tab 127 and the second electrode tab 128 drawn out from the electrode assembly 120. The movement prevention tape 130 may be attached to only one of the first electrode tab 127 and the second electrode tab 128, or may be attached to both of the first electrode tab 127 and the second electrode tab 128. The movement prevention tape 130 may be attached to at least one portion of the first electrode tab 127. The first electrode tab 127 is drawn out from the electrode assembly 120 and has one end coupled to the sub-plate 165 (FIG. 3B), so that it is positioned between the sub-plate 165 and the upper insulation member 140. In one embodiment, if the movement prevention tape 130 attached to the first electrode tab 127 comes into contact with an electrolyte, as shown in FIGS. 3B, 3C and 4, the tape 130 partially melts and exhibits adhesiveness. In another embodiment, the tape 130 at least partially shrinks and at least partially expands upon contacting the electrolyte. This applies to the remaining disclosed embodiments.

Accordingly, since the adhesive portion of the movement prevention tape 130 is positioned between the upper insulation member 140 and the sub-plate 165, movement of the first electrode tab 127 can be prevented by the adhesiveness. For example, part of the adhesive portion is adhered to a top surface of the electrode assembly 120 and some other part of the adhesive portion is adhered to the sub-plate 165 as shown in FIGS. 3B and 3C. Therefore, the adherence prevents the first electrode tab 127 from moving.

Figure 2:
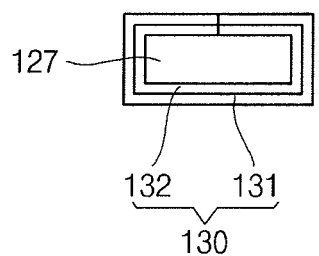
FIG. 2 is a cross-sectional view of a first electrode tab shown in FIG. 1, taken along the line A-A.

The movement prevention tape 130 may include a base layer 131 having a portion exhibiting adhesiveness due to a contact with an electrolyte, and an adhesive layer 132 formed on the reverse surface of the base layer 131 as shown in FIG. 2.

In one embodiment, the base layer 131 is formed of a polymer film partially exhibiting adhesiveness when at least a portion of the polymer film contacts the electrolyte. For example, when the polymer film contacts an electrolyte, a carbonate-based solvent contained in the electrolyte permeates between molecules of the polymer, to melt at least a portion of the film, thereby imparting adhesiveness to the film. In one embodiment, when the polymer film contacts an electrolyte, a carbonate-based solvent contained in the electrolyte melts at least a portion of the film while permeating between molecules of the polymer, and the polymer film may at least partially shrink and at least partially expand, exhibiting adhesiveness.

Here, as shown in FIGS. 3B and 3C, the adhesive portion is positioned between and adheres to the upper insulation member 140 and the sub-plate 165 and securely fixes the first electrode tab 127. Therefore, even if an external impact is applied to the cylindrical secondary battery 100, the first electrode tab 127 does not readily move.

Any film may be used as the polymer film as long as it melts due to a contact with an electrolyte to exhibit adhesiveness. The polymer film may include a film made of a material allowing easy permeation of a carbonate-based solvent in the electrolyte due to a relatively large intermolecular distance between molecules of a polymer, such as polystyrene (PS), polyamide, polyacrylonitrile, polycarbonate, polyethylene acetate or an oriented PS (OPS), which are not considered limiting.

The base layer 131 may have a thickness in a range of approximately 10 μm to approximately 50 μm, which is not considered limiting. When the thickness of the base layer 131 is in the above-mentioned range, movement of the first electrode tab 127 can be more effectively prevented.

The adhesive layer 132 is coated on the reverse surface of the base layer 131, and contacts an outer surface of the first electrode tab 127. The adhesive layer 132 may be formed of a commonly used adhesive without any particular limitation. The adhesive layer 132 may be formed by coating an acryl-based adhesive on the base layer 131. The acryl-based adhesive may include PMMA (poly methyl methacrylate), PEMA (poly ethyl methacrylate), PBMA (poly butyl methacrylate), and the like, which are not considered limiting.

The adhesive layer 132 may be coated on the base layer 131 to various thicknesses by various well-known methods. For example, the adhesive layer 132 may be formed by coating an adhesive on the base layer 131 to a thickness of about 1 μm to about 30 μm by, for example, a knife coating method.

The movement prevention tape 130 may be attached to some portion of the first electrode tab 127 drawn out from the electrode assembly 120 except for an end portion. Since the end portion of the first electrode tab 127 is a portion welded to the sub-plate 165 of the cap assembly 160, it is not necessary to attach the movement prevention tape 130 to the end portion of the first electrode tab 127. In one embodiment, the portion of the electrode tap on which the movement prevention tape is attached is a region from the boundary between the electrode tap and the electrode assembly 120 to ⅔ of the height (length) of the exposed first electrode tap. Additionally, the movement prevention tape 130 may be attached by wrapping around the first electrode tab 127 drawn out from the electrode assembly 120 at least one time.

The upper insulation member 140 is formed to have a substantially circular plate to insulate the electrode assembly 120 and the beading part 111 of the case 110 from each other. A hole 140a is formed at the center of the upper insulation member 140 to allow the first electrode tab 127 drawn out from the electrode assembly 120 to pass through the same, and the first electrode tab 127 passes through the hole 140a to then be electrically connected to the cap assembly 160.

Referring to FIG. 1, the lower insulation member 150 is formed to have a substantially circular plate to insulate the electrode assembly 120 and the bottom plate 112 of the case 110 from each other. A hole 150a is formed in the lower insulation member 150 to allow the second electrode tab 128 drawn out from the electrode assembly 120 to pass through the same, and the second electrode tab 128 passes through the hole 150a to then be electrically connected to the bottom plate 112 of the case 110.

Referring to FIGS. 1 and 3A, the cap assembly 160 includes a cap-up 161, a safety vent 162 positioned under the cap-up 161, an insulator 163 positioned under the safety vent 162, a cap-down 164 positioned under the insulator 163, a sub-plate 165 positioned on a bottom surface of the cap-down 164, and a gasket 170 surrounding these components from the outside.

The cap-up 161 is shaped of a circular plate, and has a top protrusion 161a upwardly protruding from the center. In addition, a plurality of throughholes 161b for exhausting internal gases generated in the secondary battery 100 to the outside are formed at a side portion of the top protrusion 161a. The cap-up 161 functions as a terminal that electrically conducting the current internally generated from the cylindrical secondary battery 100 to the outside. In addition, the cap-up 161 may be made of a metal material such as stainless.

The safety vent 162 is shaped of a circular plate, and positioned under the cap-up 161. The safety vent 162 has a downwardly protruding bottom protrusion 162a formed at its center, and has a peripheral portion formed in a substantially "Z" shape. The safety vent 162 may be made of a conductive metal material. Meanwhile, the bottom protrusion 162a may further include a central groove (not shown) formed at its center and a cross-shaped groove (not shown) formed crosswise based on the central groove. When gases are generated inside the case 110 and the internal pressure of the case 110 increases a predetermined critical value or higher, the bottom protrusion 162a of the safety vent 162 is upwardly swollen. Here, the central groove of the bottom protrusion 162a and the peripheral area of the cross-shaped groove are fractured, so that the safety vent 162 is separated from the sub-plate 165 installed under the safety vent 162 to then be electrically disconnected, thereby interrupting current flow. Additionally, the safety vent 162 is configured to be opened by the fracture of the bottom protrusion 162a to allow the internal gas of the case 110 to be exhausted to the outside of the case 110. That is to say, the safety vent 162 is one of safety devices for preventing the cylindrical secondary battery 100 from exploding due to an internal gas pressure.

Although not shown, a secondary protection device may further be provided between the cap-up 161 and the safety vent 162. The secondary protection device may be a positive temperature coefficient (PTC) device that interrupts current flow when the temperature of the cylindrical secondary battery 100 rises. The PTC device may include a resin layer made of a resin and carbon powder, and conductive plates coupled to upper and lower surfaces of the device layer. If the temperature of the PTC device increases, the resin of the resin layer swells, cutting interconnection between carbon powder molecules, thereby interrupting current.

In one embodiment, as shown in FIG. 1, The insulator 163 is formed to have an annular shape, and is formed between the safety vent 162 and the cap-down 164 to insulate the safety vent 162 and the cap-down 164 from each other.

In one embodiment, the cap-down 164 is formed to have a circular plate, and is positioned under the insulator 163. In addition, a central throughhole 164a is formed at the center of the cap-down 164. The bottom protrusion 162a of the safety vent 162 is inserted into and passes through the central throughhole 164a providing a path for exposing the bottom protrusion 162a to a lower portion of the cap assembly 160. In addition, the cap-down 164 has a plurality of holes 164b formed around the central throughhole 164a. The holes 164b function to release gases generated in the electrode assembly 120.

Referring to FIG. 3A, the sub-plate 165 is fixed while shutting the central throughhole 164a of the cap-down 164. In addition, the sub-plate 165 is coupled to the bottom protrusion 162a of the safety vent 162. A positive electrode tab, that is, the first electrode tab 127 drawn out from the electrode assembly 120 is attached to the bottom surface of the sub-plate 165 to then be electrically connected to the sub-plate 165. In one embodiment, the sub-plate 165 is made of a metal material. Here, the safety vent 162 and the sub-plate 165 are coupled to each other, while the cap-down 164 and the sub-plate 165 are coupled to each other. Therefore, the safety vent 162, the cap-down 164 and the sub-plate 165 are incorporated into one body, forming a current interrupt device (CID).

The gasket 170 is interposed between the opening 114 of the cylindrical case 110 and the cap assembly 160, thereby substantially hermetically sealing the battery. The gasket 170 is configured to compress the cap-up 161 fastened to either interior side of the gasket 170, and the peripheral portion of the safety vent 162 coupled to a bottom portion of the cap-up 161 from upper and lower sides. The gasket 170 may be made of a resin material such as polyethyleneterephthalate or polyethylene. The gasket 170 prevents the cap assembly 160 from being separated from the case 110.

The cylindrical secondary battery 100 includes an electrolyte. The electrolyte may include a carbonate-based solvent. The carbonate-based solvent may be exemplified by dimethyl carbonate (DMC), diethyl carbonate (DEC), dipropyl carbonate (DPC), methylpropyl carbonate (MPC), ethylpropyl carbonate (EPC), methylethyl carbonate (MEC) ethylene carbonate (EC), propylene carbonate (PC), butylene carbonate (BC), and so on. The carbonate-based solvent may include at least one selected from the group consisting of DMC, DEC and DPC among the exemplified carbonate-based solvents. Such a carbonate based solvent may easily permeate between molecules of a polymer such as polystyrene (PS) having a relatively large intermolecular distance. Therefore, when the carbonate-based solvent contacts the movement prevention tape 130, it is easily permeated between molecules of the polymer in the base layer 131, thereby melting the base layer 131 and exhibiting adhesiveness.

In one embodiment, the carbonate-based solvent is contained in an amount of about 10% to about 60% by weight based on the total weight of the electrolyte. The above range may provide an optimum balance between permeation characteristic and movement preventing efficiency. However, other ranges are also possible, depending on the embodiment.

The electrolyte may further include generally commercially available components in addition to the carbonate-based solvent. The electrolyte may be any electrolyte as long as it is an electrolyte containing DMC, DEC or DPC.

Figure 5:
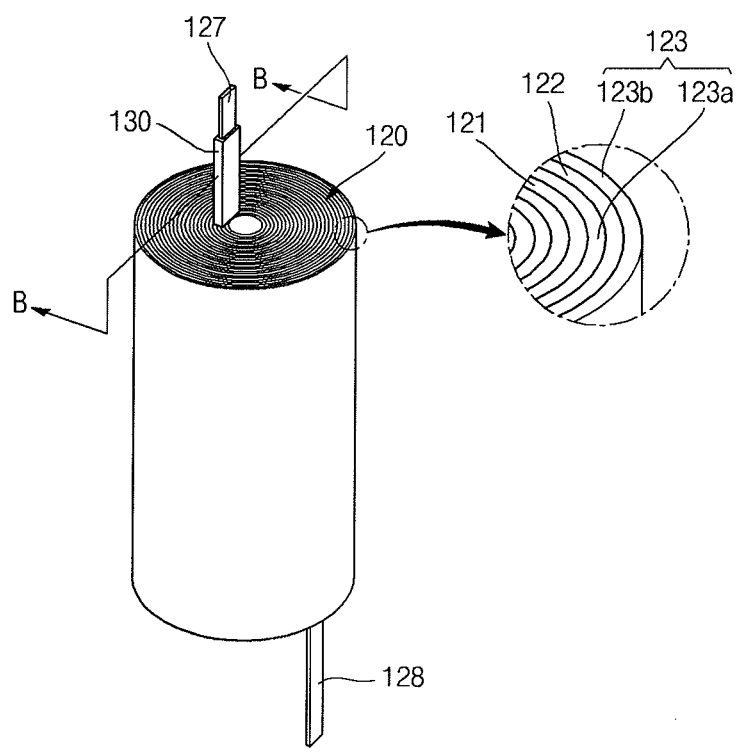
FIG. 5 is a perspective view of an electrode assembly used in a cylindrical secondary battery according to another embodiment.
Figure 6:
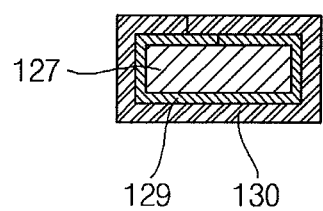
FIG. 6 is a cross-sectional view of a first electrode tab shown in FIG. 5, taken along the line B-B.

FIG. 5 is a perspective view of an electrode assembly used in a cylindrical secondary battery according to another embodiment, and FIG. 6 is a cross-sectional view of a first electrode tab shown in FIG. 5, taken along the line B-B. As shown in FIGS. 5 and 6, an electrode assembly 120 includes a first electrode plate 121 having a first electrode tab 127, a second electrode plate 122 having a second electrode tab 128, and a separator 123. In addition, an insulation tape 129 is attached to an interface between the first and second electrode plates 121 and 122 from which the first electrode tab 127 and the second electrode tab 128 are drawn out from the electrode assembly 120. Further, a movement prevention tape 130 is attached to an outer side of the insulation tape 129 while wrapping the insulation tape 129.

In one embodiment, the insulation tape 129 is attach to both of the first electrode tab 127 and the second electrode tab 128 and the movement prevention tape 130 is attached to wrap around the insulation tape 129 attached to the first electrode tab 127. Alternatively, the movement prevention tape 130 may also be attached to wrap around the insulation tape 129 of the second electrode tab 128.

The other components of the electrode assembly 120, except for the movement prevention tape 130 and the insulation tape 129, are the same as those described in FIGS. 1 through 3, and a detailed description thereabout will be omitted.

The insulation tape 129 prevents a short circuit between the first electrode tab 127 and the second electrode plate 122 or between the second electrode tab 128 and the first electrode plate 121, and may be made of a generally commercially available insulating material. The insulation tape 129 may be formed by coating an adhesive on a film made of, for example, polyethyleneterephthalate (PET), polypropylene (PP), polyethylene (PE), or polyimide (PI). Here, any adhesive may be used as long as it has an adhesive force. The adhesive used with the movement prevention tape 130 may be applied to the insulation tape 129.

The movement prevention tape 130 is attached to the insulation tape 129 of the first electrode tab 127. Since a configuration of the movement prevention tape 130 is substantially the same as described in FIGS. 1 through 3, a detailed description thereabout will be omitted.

As described above, when the insulation tape 129 is attached to the first electrode tab 127 and the second electrode tab 128 and the movement prevention tape 130 is applied to the insulation tape 129, improved insulation characteristics can be attained, compared to a case when the movement prevention tape 130 without the insulation tape 129 attached thereto is applied.

Figure 7:
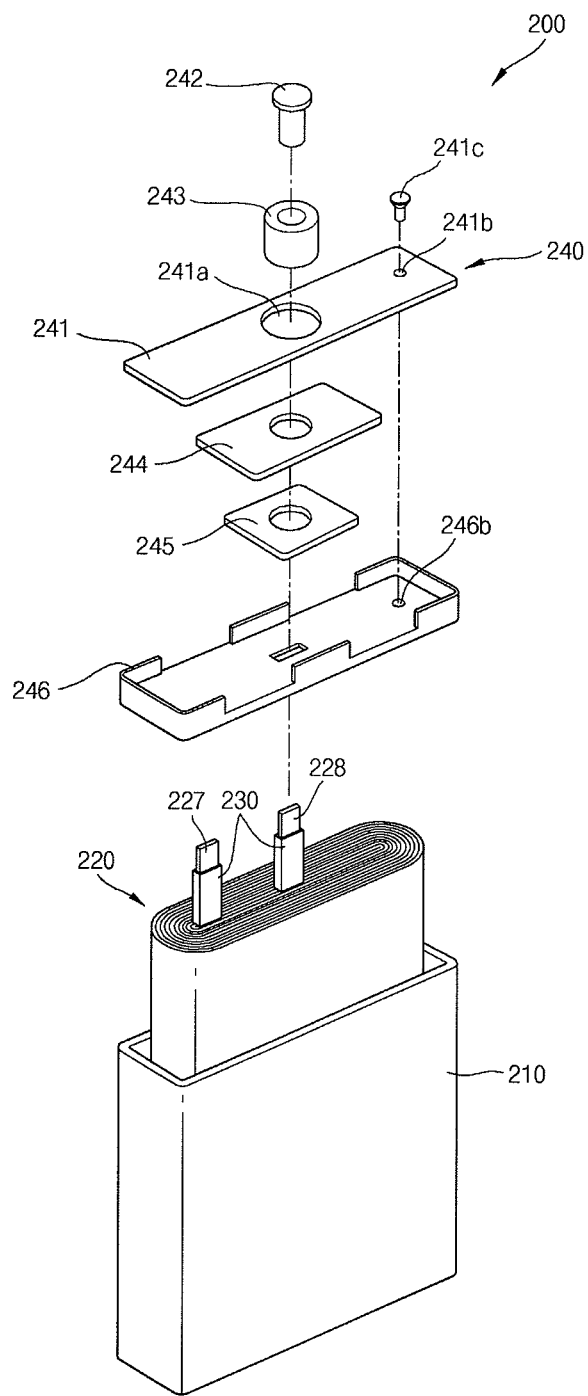
FIG. 7 is a perspective view of a prismatic secondary battery according to still another embodiment.

FIG. 7 is a perspective view of a prismatic secondary battery according to still another embodiment. As shown in FIG. 7, the prismatic secondary battery 200 includes a substantially prismatic case 210, an electrode assembly 220 accommodated within the case 210, and a cap assembly 240 coupled to an upper portion of the case 210.

The case 210 may be formed of a metal can having a substantially rectangular shape, and may serve as a terminal. The electrode assembly 220 includes a first electrode plate, a second electrode plate, and a separator, and is formed by, for example, winding a stack of the first electrode plate, the second electrode plate, and the separator interposed between the first and second electrode plates in a substantially rectangular configuration.

The electrode assembly 220 includes a first electrode tab 227 and a second electrode tab 228. A movement prevention tape 230 is attached to the first electrode tab 227 and the second electrode tab 228 drawn out from the electrode assembly 220.

The electrode assembly 220 has a substantially the same configuration as that of the electrode assembly 120 of the previously described cylindrical secondary battery, except that i) the electrode assembly 220 has a substantially rectangular shape, ii) the electrode tabs 227 and 228 are drawn out in the same direction, and iii) the movement prevention tape 230 is attached to both of the first electrode tab 227 and the second electrode tab 228, and a detailed description thereabout will be omitted. In addition, since the movement prevention tape 230 attached to electrode tabs 227 and 228 is the same as the corresponding component of the previously described cylindrical secondary battery, a detailed description thereabout will be omitted.

As described above in the cylindrical secondary battery, in order to prevent a short circuit between the first electrode plate and the second electrode plate, an insulation tape (not shown) may be formed at an interface from which the first electrode tab 227 and the second electrode tab 228 are drawn out, and the movement prevention tape 230 may be formed to wrap around the insulation tape.

In one embodiment, when the movement prevention tape 230 contacts an electrolyte, at least a portion of the movement prevention tape 230 exhibits adhesiveness, movement of the first electrode tab 227 and the second electrode tab 228 can be prevented due to an adhesive force of the adhesive portion.

The cap assembly 240 includes a cap plate 241 having a size and a shape corresponding to those of an opening of the case 210. A terminal throughhole 241a is formed at the center of the cap plate 241, and an electrolyte injection hole 241b for injecting an electrolyte is formed at one side of the cap plate 241. The electrolyte injection hole 241b is coupled to a plug 241c to be substantially hermetically sealed.

An electrode terminal 242, for example, a negative electrode terminal, may be inserted into the terminal throughhole 241a. A gasket 243 for electrically insulating the electrode terminal 242 from the cap plate 241 is provided on an outer surface of the electrode terminal 242. An insulation plate 244 is disposed on a bottom surface of the cap plate 241. A terminal plate 245 is installed on a bottom surface of the insulation plate 244.

The electrode terminal 242 is inserted into the terminal throughhole 241a while the gasket 243 wraps around the outer surface of the electrode terminal 242. A bottom surface of the electrode terminal 242 is electrically connected to the terminal plate 245 in a state in which the insulation plate 244 is interposed between the electrode terminal 242 and the terminal plate 245.

In one embodiment, the first electrode tab 227 drawn out from the first electrode plate is welded to the bottom surface of the cap plate 241, and the second electrode tab 228 drawn out from the second electrode plate is welded to the bottom surface of the electrode terminal 242.

Meanwhile, an insulation case 246 is installed on a top surface of the electrode assembly 220. The insulation case 246 electrically insulates the electrode assembly 220 and the cap assembly 240 from each other and covers a top portion of the electrode assembly 220. The insulation case 246 includes an electrolyte injection hole 246b formed at a location corresponding to the electrolyte injection hole 241b of the cap plate 241, and an electrolyte is injected into the insulation case 246 through the electrolyte injection hole 246b. In one embodiment, the insulation case 246 is made of an insulating polymer resin, polypropylene, which are not considered limiting.

Although not shown, the prismatic secondary battery 200 may also include a protective circuit module and a top cover. For example, the protective circuit module controls charge/discharge operations or malfunction of the electrode assembly 220. In one embodiment, when an over-current is applied from the electrode assembly 220, the protective circuit module may function to interrupt the over-current. The protective circuit module is generally configured to have various protective circuits. In addition, the top cover may cover the protective circuit module. The protective circuit module and the top cover may be easily formed by a skilled person in the related technology.

In one embodiment, when the movement prevention tape 230 attached to the electrode tabs 227 and 228 contacts an electrolyte, at least a portion of the movement prevention tape 230 melts, exhibiting adhesiveness. Since the adhesive portion of the movement prevention tape 230 is positioned between the cap assembly 240 and the electrode assembly 220, it is possible to prevent the electrode tabs 227 and 228 from moving. That is, since the electrode tabs 227 and 228 are securely fixed due to an adhesive force, they can be prevented from moving inside the case 210.

Figure 8:
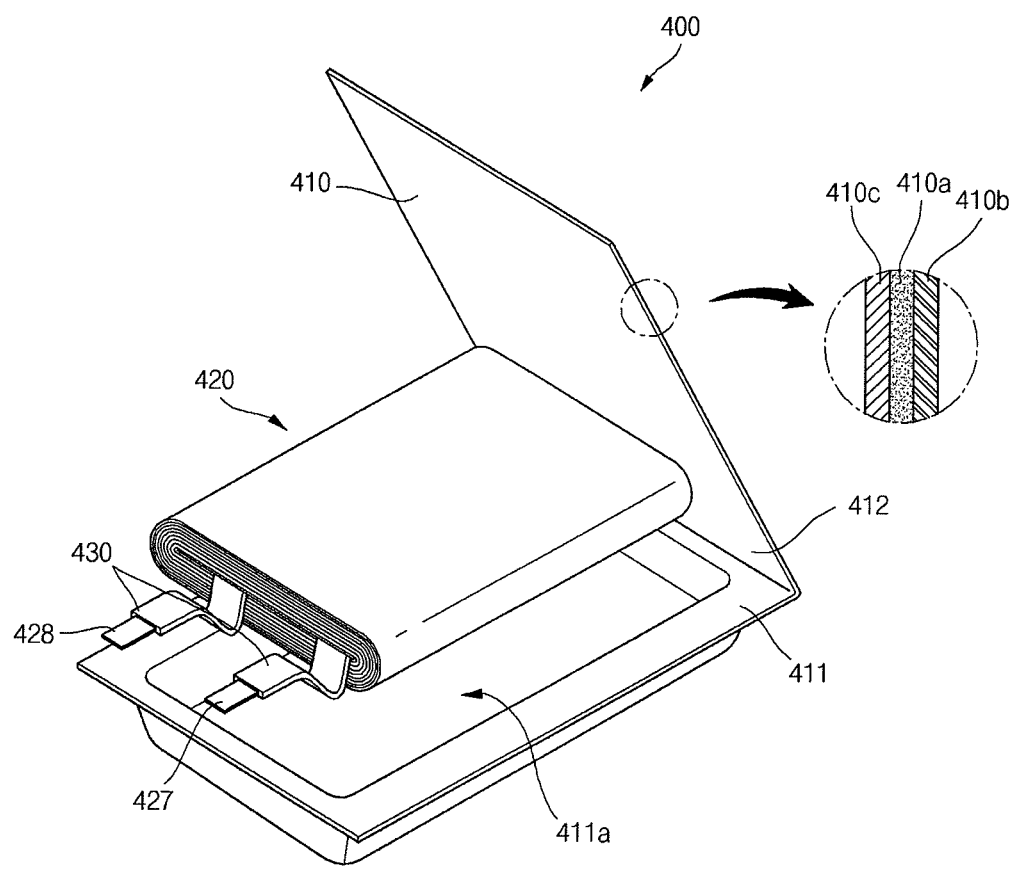
FIG. 8 is a perspective view of a pouch type secondary battery according to still another embodiment.

FIG. 8 is a perspective view of a pouch type secondary battery according to still another embodiment. Referring to FIG. 8, the pouch-type secondary battery 400 includes a pouch-type case 410, an electrode assembly 420 accommodated in the case 410 and including a first electrode tab 427 and a second electrode tab 428, and a movement prevention tape 430 attached at least one portion of the first electrode tab 427 and the second electrode tab 428.

The case 410 may include a core portion 410a made of a metal such as aluminum (Al), a heat fusion layer 410b formed on a top surface of the core portion 410a, and an insulation film 410c formed on a bottom surface of the core portion 410a. The heat fusion layer 410b serves as an adhesive layer using a modified polypropylene as a polymer resin, for example, casted polypropylene (CPP), and the insulation film 410c may be made of a resin material such as nylon or polyethyleneterephthalate (PET). The configuration and material of the pouch-type case 410 is not limited to those illustrated herein. The case 410 includes a bottom surface 411 having a space 411a for accommodating the electrode assembly 420, and a top surface 412 covering the bottom surface 411 having the space 411a. The space 411a for accommodating the electrode assembly 420 may be formed by pressing, for example.

After accommodating the electrode assembly 420 in the space 411a of the bottom surface 411, the case 410 is coupled to the electrode assembly 420 by covering and substantially hermetically sealing the top surface 412.

Since the electrode assembly 420 and the movement prevention tape 430 attached to the first electrode tab 427 and the second electrode tab 428 of the electrode assembly 420 are substantially the same as the corresponding components of the previously described prismatic secondary battery 200, a detailed description thereabout will be omitted.

The electrode assembly 420 is accommodated in the case 410. Thereafter, the first electrode tab 427 and the second electrode tab 428 are drawn out in a predetermined direction by a predetermined length. In one embodiment, the movement prevention tape 430 is attached to only the electrode tabs 427 and 428 disposed inside the case 410, but not attached to outwardly drawn portions of the electrode tabs 427 and 428.

Although not shown, the pouch-type secondary battery 400 may also include a protective circuit module. The protective circuit module controls charge/discharge operations or malfunction of the electrode assembly 420. In one embodiment, when an over-current is applied from the electrode assembly 420, the protective circuit module may function to interrupt the over-current. The protective circuit module is generally configured to have various protective circuits. Here, the protective circuit module is electrically to the first electrode tab 427 and the second electrode tab 428 of the electrode assembly 420.

In one embodiment, when the movement prevention tape 430 contacts an electrolyte, at least a portion of the movement prevention tape 430 melts and exhibits adhesiveness. Here, the adhesive portion can effectively suppress the electrode tabs 427 and 428 from moving inside the case 410 due to an adhesive force.

Hereinafter, a fabricating method of a secondary battery will be described. Depending on the embodiments, additional processes may be added, others removed, or the order of the processes changes. The fabricating method includes an electrode assembly inserting process and an electrolyte injection process. In the electrode assembly inserting process, a movement prevention tape exhibiting adhesiveness on at least a portion thereof due to a contact with an electrolyte is attached to at least one portion of surfaces of first electrode tab 127 and/or a second electrode tab drawn out from the electrode assembly, and the electrode assembly is inserted into a case. In the electrolyte injection process, the movement prevention tape is brought into contact with an electrolyte to allow at least a portion of the movement prevention tape to exhibit adhesiveness.

The fabricating method of the secondary battery according to one embodiment will now be described with reference to FIGS. 1 through 3. In the following, the fabricating method of the secondary battery will be described with regard to a cylindrical secondary battery 100. However, one skilled in the art can easily practice the fabricating method of the secondary battery applied to other types of a secondary battery such as a prismatic secondary battery and a pouch-type secondary battery.

The fabricating method of the cylindrical secondary battery 100 includes inserting an electrode assembly 120 and injecting an electrolyte.

In the inserting of the electrode assembly 120, a movement prevention tape 130, which exhibits adhesiveness on at least a portion thereof when it contacts an electrolyte, is attached to at least one portion of an outer surface of the first electrode tab 127 drawn out from the electrode assembly 120, and the electrode assembly 120 is inserted into a case 110.

Since the movement prevention tape 130 has previously been described in detail with regard to the cylindrical secondary battery 100, a detailed description thereof will be omitted.

Before and after inserting the electrode assembly 120 into the case 110, some of the other components of the secondary battery 100 may be assembled.

For example, in a state in which a lower insulation member 150, the electrode assembly 120 and an upper insulation member 140 are disposed in turn from the bottom, the second electrode tab 128 of the electrode assembly 120 is coupled to the bottom plate 112 of the case 110 by, for example, welding. In this stage, a beading part 111 and a crimping part 116 are not formed in the case 110.

Next, the beading part 111 is formed on a sidewall 113 of the case 110, thereby preventing the lower insulation member 150, the electrode assembly 120 and the upper insulation member 140 from moving inside the case 110 in a direction substantially perpendicular to the bottom plate 112.

As described above, the electrode assembly 120 is accommodated in the case 110 and the other components are assembled, followed by the electrolyte injection process.

In the electrolyte injection process, the movement prevention tape 130 is brought into contact with an electrolyte, thereby allowing at least a portion of the movement prevention tape 130 to exhibit adhesiveness.

The electrolyte allows lithium ions generated from electrodes by an electrochemical reaction during charging and discharging operation to move. Since the electrolyte is the same as described above, a detailed description thereof will be omitted.

When the electrolyte is injected into the case 110, the electrolyte comes into contact with the movement prevention tape 130 attached to the first electrode tab 127 of the electrode assembly 120. Here, at least a portion of the movement prevention tape 130 melts, imparting an adhesive force to the movement prevention tape 130. The adhesive portion of the movement prevention tape 130 prevents the first electrode tab 127 from moving inside the case 110.

After the inserting of the electrolyte, the other components of the secondary battery 100 are assembled. For example, the gasket 170 is inserted into the case 110 through an opening formed in the case 110 to then be placed on the beading part 111. Then, the cap assembly 160 is positioned within the gasket 170, and the crimping part 116 is formed at a top end of the sidewall 113 of the case 110, thereby fixing the gasket 170 and the cap assembly 160.

As described above, once the secondary battery 100 is assembled, the general post-treatment, that is, formation and aging processes, may be performed. The formation and aging processes may be commonly applied to the prismatic secondary battery and the pouch-type secondary battery.

The formation process activates the assembled battery by repeating charging and discharging operations. During a charging operation in the formation process, lithium ions derived from lithium metal oxide used as a material of a positive electrode move to a carbon electrode as a negative electrode for intercalation. Since lithium is highly reactive, it reacts with the carbon, negative electrode to then produce a compound, such as $Li_2CO_3$, LiO, or LiOH, forming a coating called a solid electrolyte interface (SEI) on a surface of the carbon electrode.

The aging process allows the battery to stand undisturbed for a predetermined period to stabilize the SEI coating. The aging process is generally performed by placing the assembled secondary battery 100 under the condition of about 50° C. to about 70° C. for about 18 hours to about 36 hours. Through the aging process, at least a portion of the movement prevention tape 130 melts to give a sufficiently high adhesive force. Accordingly, electrode tab movement can be effectively prevented.

Hereinafter, another embodiment will be described in more detail through the following examples, which are not considered limiting.

Example 1

$LiCoO_2$ as a positive electrode active material, polyvinylidene fluoride (PVdF) as a binder, and carbon as a conductive agent were mixed in a ratio of 92:4:4 by weight, and dispersed in N-methyl-2-pyrrolidone to prepare a positive electrode slurry. The positive electrode slurry was coated on a 20 μm thick aluminum foil, dried, and pressed to prepare a positive electrode plate.

Artificial graphite as a negative electrode active material, styrene-butadiene rubber as a binder, and carboxymethylcellulose as a thickening agent were mixed in a ratio of 96:2:2, and dispersed in water to prepare a negative electrode slurry. The negative electrode slurry was coated on a 15 μm thick copper foil, dried, and pressed to prepare a negative electrode plate.

A 20 μm thick polyethylene/polypropylene porous film (commercially available from Hoechst Celanese of USA) was used as a separator. The separator was disposed between the positive electrode plate and the negative electrode plate and the resultant structure was wound to prepare an electrode assembly. Here, a movement prevention tape was attached to a positive electrode tab drawn out from the electrode assembly. The movement prevention tape was formed by coating a PMMA adhesive on a 32 μm OPS film to a thickness of 15 μm. A long diameter of the electrode assembly was 17.00 mm and a short diameter thereof was 16.56 mm. The movement prevention tape was wrapped around the positive electrode tab one time to be attached by at least two third (⅔) of a boundary surface of the electrode assembly from which the first electrode tab is drawn out. The electrode assembly wound in a jellyroll configuration was put into a cylindrical battery case made of aluminum, and an electrolyte was injected into the battery case, followed by assembling and substantially hermetically sealing a cap assembly, thereby completing a secondary battery.

Here, a mixed organic solvent including ethylene carbonate (EC):dimethyl carbonate (DMC):propylene carbonate (PC):fluorobenzene (FB) mixed in a ratio of 30:55:5:10 by volume dissolved in 1.1 M $LiPF_6$ was used as the electrolyte.

Although specific types of materials (electrode materials, binder, conductive agent, separator, base layer, adhesive layer, solvent, electrolyte, etc.) or parameters (thickness, diameter, adhesive force or tensile strength, etc.) were used in the above example 1, it is expected that substantially the same or similar benefits are obtained from other type of materials or parameters discussed in connection with FIGS. 1-9.

Experimental Example

Each of five secondary batteries fabricated in the same manner as Example 1 was subjected to a formation process, followed by cutting beading part. Then, an upper end of a first electrode tab welded to a sub-plate of a cap assembly was cut. The resultant product is shown in FIG. 4.

Next, a tensile strength (adhesive force) was measured by use of a push-pull gauge connected to the upper end of the first electrode tab having a movement prevention tape attached thereto and the measurement result is listed in Table 1.

Comparative Experimental Example

Each of five secondary batteries fabricated in substantially the same manner as Example 1, except that a polyimide (PI) insulation tape, instead of the movement prevention tape, was used, was subjected to a formation process, followed by cutting beading part. Then, an upper end of a first electrode tab welded to a sub-plate of a cap assembly was cut. The resultant product is shown in FIG. 4.

Thereafter, adhesive force was measured by use of a push-pull gauge connected to the upper end of the first electrode tab having a movement prevention tape attached thereto and the measurement result is listed in Table 1.

TABLE 1

| Battery | Adhesive Force ($Kgf/cm^2$) in Experimental Example | Adhesive Force ($Kgf/cm^2$) in Comparative Experimental Example |
| --- | --- | --- |
| 1 | 0.15 | 0 |
| 2 | 0.27 | 0 |
| 3 | 0.10 | 0 |
| 4 | 0.25 | 0 |
| 5 | 0.32 | 0 |
| Mean | 0.22 | 0 |

As confirmed from Table 1, at least a portion of the movement prevention tape attached to the positive electrode tab drawn out from the electrode assembly melted, exhibiting adhesiveness. Therefore, according to at least one of the disclosed embodiments, it is possible to effectively prevent the electrode tab from moving inside the case.

According to at least one of the disclosed embodiments, the electrode tab is securely fixed to the case by an adhesive force of the adhesive portion of the movement prevention tape. Accordingly, the secondary battery can prevent the electrode tab from moving inside the case due to an external impact, such as an external vibration or a drop.

Although the disclosed embodiments have been described with reference to the accompanying drawings, the foregoing disclosure should be interpreted as illustrative only and it should be understood that various modifications and variations can be easily made by those skilled in the art without departing from the scope and spirit of the following claims.

What is claimed is:

1. A secondary battery, comprising:
   an electrode assembly;
   first and second electrode tabs spaced apart from each other and extending from the electrode assembly, wherein the first and second electrode tabs have first and second outer surfaces, respectively;
   an electrolyte;
   a movement prevention tape attached to at least a portion of at least one of the first and second outer surfaces, wherein at least part of the movement prevention tape is configured to become adhesive upon contacting the electrolyte; and
   a can accommodating the electrode assembly, electrode tabs and movement prevention tape,
   wherein the movement prevention tape comprises i) an adhesive layer at least partially surrounding at least one of the first and second outer surfaces and ii) a base layer formed on the adhesive layer, and wherein at least part of the base layer is configured to become adhesive upon contacting the electrolyte.

2. The secondary battery of claim 1, wherein an adhesive portion of the base layer has a tensile strength of at least about 0.1 kgf/cm$^2$.

3. The secondary battery of claim 1, wherein the base layer is formed of a polymer film.

4. The secondary battery of claim 3, wherein the electrolyte contains a carbonate-based solvent, and wherein the carbonate-based solvent is configured to melt at least a portion of the polymer film.

5. The secondary battery of claim 3, wherein the polymer film is configured to at least partially shrink and at least partially expand.

6. The secondary battery of claim 3, wherein the polymer film is formed of at least one of the following: polystyrene (PS), polyamide, polyacrylonitrile, polycarbonate, polyethylene acetate and oriented polystyrene.

7. The secondary battery of claim 1, wherein the base layer has a thickness of about 10 μm to about 50 μm.

8. The secondary battery of claim 1, wherein the adhesive layer is formed of at least one of the following: PMMA (poly methyl methacrylate), PEMA (poly ethyl methacrylate) and PBMA (poly butyl methacrylate).

9. The secondary battery of claim 1, wherein the adhesive layer has a thickness of about 1 μm to about 30 μm.

10. The secondary battery of claim 1, wherein the first and second electrode tabs have first and second lengths, respectively, and wherein the base layer is formed between i) a portion of about ⅔ of the length of at least one of the first and second electrode tabs and ii) the electrode assembly.

11. The secondary battery of claim 10, wherein the movement prevention tape substantially completely surrounds at least one of the first and second electrode tabs.

12. The secondary battery of claim 1, further comprising:
    a cap assembly configured to substantially close the can;
    a sub-plate accommodated in the can and attached to the cap assembly; and
    an insulator formed on a surface of the electrode assembly, wherein an adhesive portion of the movement prevention tape contacts at least one of the sub-plate and insulator.

13. A secondary battery, comprising:
    an electrode assembly;
    first and second electrode tabs spaced apart from each other and extending from the electrode assembly, wherein the first and second electrode tabs have first and second outer surfaces, respectively;
    an electrolyte;
    a movement prevention tape attached to at least a portion of at least one of the first and second outer surfaces, wherein at least part of the movement prevention tape is configured to become adhesive upon contacting the electrolyte;
    a can accommodating the electrode assembly, electrode tabs and movement prevention tape; and
    an insulation tape formed between i) at least one of the first and second outer surfaces and ii) the movement prevention tape.

14. The secondary battery of claim 1, wherein the first and second electrode tabs are attached to opposite sides of the electrode assembly.

15. The secondary battery of claim 1, wherein the first and second electrode tabs are attached to the same side of the electrode assembly.

16. The secondary battery of claim 15, wherein the movement prevention tape is attached to the first and second outer surfaces.

17. A secondary battery, comprising:
    an electrode assembly;
    first and second electrode tabs spaced apart from each other and extending from the electrode assembly, wherein the first and second electrode tabs have first and second outer surfaces, respectively;
    a movement prevention tape attached to at least a portion of at least one of the first and second outer surfaces;
    a can accommodating the electrode assembly, electrode tabs and movement prevention tape; and
    a cap assembly configured to substantially close the can,
    wherein at least part of the movement prevention tape contacts at least the cap assembly,
    wherein the movement prevention tape comprises i) an adhesive layer at least partially surrounding at least one of the first and second outer surfaces and ii) a base layer formed on the adhesive layer.

18. The secondary battery of claim 17, wherein the at least part of the movement prevention tape contacts the electrode assembly.

19. The secondary battery of claim 17, wherein the base layer has a tensile strength of at least about 0.1 kgf/cm$^2$.

20. The secondary battery of claim 17, further comprising:
    a sub-plate accommodated in the can and attached to the cap assembly; and
    an insulator formed on a surface of the electrode assembly, wherein at least part of the base layer contacts at least one of the sub-plate and insulator.

21. The secondary battery of claim 17, wherein the base layer is formed of at least one of the following: polystyrene (PS), polyamide, polyacrylonitrile, polycarbonate, polyethylene acetate and oriented polystyrene.

* * * * *